B. WALTERS.
RESILIENT WHEEL.
APPLICATION FILED MAR. 29, 1912.
1,140,088.
Patented May 18, 1915.
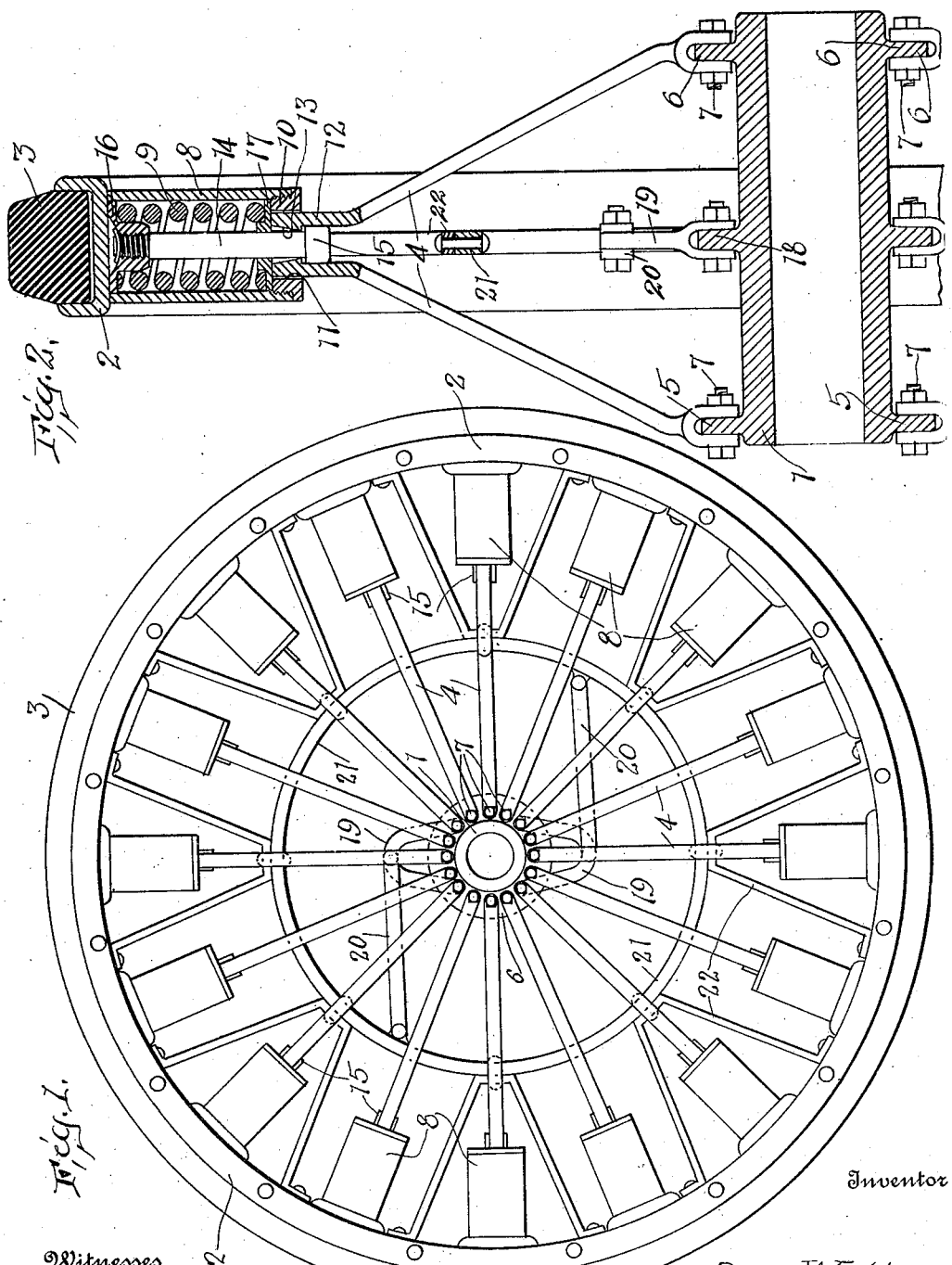
Witnesses
G. Howard Walmsley
Harriet L. Hammaker
Inventor
Bert Walters,
By
Toulmin & Reed
Attorney

UNITED STATES PATENT OFFICE.

BERT WALTERS, OF SPRINGFIELD, OHIO, ASSIGNOR TO CLARENCE H. KAY, OF SPRINGFIELD, OHIO.

RESILIENT WHEEL.

1,140,088.        Specification of Letters Patent.        Patented May 18, 1915.

Application filed March 29, 1912. Serial No. 686,998.

*To all whom it may concern:*

Be it known that I, BERT WALTERS, citizen of the United States, residing at Springfield, in the county of Clark and State of Ohio, have invented certain new and useful Improvements in Resilient Wheels, of which the following is a specification, reference being had therein to the accompanying drawing.

This invention relates to wheels and the object of the invention is to provide a strong, durable wheel of comparatively light weight, and further to provide such a wheel which will have a high degree of resiliency.

To this end it is also an object of the invention to provide a substantially rigid rim to which the spokes are yieldingly connected and a hub to which the spokes are pivotally connected, thereby permitting the rim as a whole to have movement relatively to the hub.

In the accompanying drawings, Figure 1 is a side elevation of a wheel embodying my invention; and Fig. 2 is a section taken radially of the wheel showing in section the hub and the device for connecting the spokes with the rim.

In these drawings I have illustrated one embodiment of my invention and have shown the same as comprising a hub 1, surrounded by and connected to a rim 2 which is preferably of substantially rigid material and has within itself little or no resiliency. This rim may be provided with a tread surface or tire, if desired. As here shown it is provided with the usual solid rubber tire 3. The rim is connected with the hub by means of a series of spokes 4, each of which is pivotally connected at its inner end with the hub 1 and has a yielding reciprocal connection with the rim. In the present instance I have shown each spoke as comprising two members, connected at their inner ends to the hub on opposite sides of the transverse center thereof, converging outwardly and rigidly connected one to the other at a point more or less remote from the rim, that portion of the spoke between the rim and the junction of the two members being arranged in the plane of the rim.

For the purpose of the present wheel, each member of the spoke is pivotally connected at its inner end with the hub on an axis substantially parallel with the axis of the hub. The hub is provided near its ends with circumferential flanges 5 and 6 to which the ends of the spoke members are connected. As here shown, the inner end of each spoke is bifurcated and has one arm on each side of its flange, to which said arms are connected by a bolt 7.

The outer end of each spoke is so connected with the rim that it may have movement from its normal position either toward or away from the rim and its movement in either direction will be resisted by means of a spring. To this end the rim has rigidly secured thereto about its inner periphery a series of cylinders 8, one for each spoke, and each cylinder has mounted therein a spring 9 which is confined between the parts connected with the spokes. In the present instance the inner end of the cylinder is closed by means of a collar 10 having a central opening 11 forming a guideway within which is mounted the outer end portion of the respective spoke. The outer end portion of each spoke, which is indicated at 12 and which extends through the opening in the collar 10, is provided with a central opening 13 having its walls flared outwardly and adapted to receive a stem 14 provided at its inner end with a head 15 which is normally in engagement with the shoulder formed at the inner end of the diverging walls 13 of the spoke end 12. This stem is thus caused to move inwardly with the spoke but the spoke is free to move outwardly independently of the stem. Further, the flared walls of the opening 13 permits the stem to have a limited rocking movement relatively to the spoke. The stem 14 extends through the coiled spring 9 and is provided at its outer end with a flanged head 16, against which bears the outer end of the spring. A collar 17 extends about the stem and normally rests upon the collar 10. The width of the collar 17 is greater than the width of the collar 10 and, consequently, its inner edge extends over the edge of the spoke end 12 and will be engaged by the spoke when it moves outward. It will be apparent, therefore, that if the spoke is moved outward the collar 17 will be forced against the spring 9 and the spring compressed, whereby the spring will offer a yielding resistance to the outward movement of the spoke. If the tendency of the spoke is to move inward the flanged head 16 will engage the opposite end of the spring and compress the same, whereby a yielding resistance is offered to the inward movement of the spoke. Further, the spoke is capable of pivotal movement relatively both to the hub and to the rim, it being apparent that the loose fit of the spoke end within the collar will permit the spoke to have a limited pivoted or swinging movement relatively to the cylinder and to the rim. It will be obvious, therefore, that the rim as a whole is free to move relatively to the hub and that when the hub is supporting a load and the wheel strikes an obstruction in the roadway the rim as a whole will move upward.

The cylinders on the lower portion of the wheel will move inward toward their spokes and the springs within the cylinders will thus be compressed. The cylinders on the upper portion of the wheel will move outward away from their spokes, thus causing their springs to be compressed. The outer ends of the spokes in the front and in the rear of the hub will be carried upward with the rim and the inner ends will move about their axes. This movement being cushioned by the springs in the several cylinders and the movement of the spokes being resisted in both directions, it will be obvious that little or no movement will be transmitted from the rim to the hub and that the wheel will have a high degree of efficiency.

Preferably a driving connection is interposed between the hub and the rim and, as here shown, a collar 18 is mounted centrally upon the hub and provided with oppositely extending arms 19 which are connected by means of links 20 with the rim. In the present instance the connection is not made directly with the rim but with a ring 21 arranged between the rim and the hub and rigidly connected with the rim by means of brackets 22. Thus the rotation of the hub will be imparted to the rim through a medium other than the spokes and the spokes will be free from driving strains and the efficiency of the wheel will not be impaired thereby.

While I have shown and described one embodiment of my invention it will be understood that this has been chosen for purposes of illustration only and that I do not desire to be limited to the details of construction shown and described for obvious modifications will occur to one skilled in the art.

Having thus fully described my invention, what I claim as new and desire to secure by Letters Patent, is:—

1. In a wheel, the combination, with a hub, a rim, spokes pivotally connected at their inner ends to said hub and at their outer ends with said rim, said spokes being rigid throughout their length and being capable of radial movement relatively to said rim, and resilient devices interposed between the outer ends of said spokes and said rim, of a positive driving connection between said hub and said rim.

2. In a wheel, the combination, with a hub, a rim, a spoke pivotally connected with said hub, said spoke being rigid throughout its length, a connecting device interposed between the outer end of said spoke and said rim and comprising a yielding device to cushion the movement of said spoke in either direction, of a positive driving connection interposed between said hub and said rim.

3. In a wheel, the combination, with a hub, a rim, and a spoke pivotally connected with said hub, of a casing rigidly secured to said rim and having a guideway in one end thereof to receive the outer end of said spoke, said outer end of said spoke having an opening therein, a spring mounted within said casing and having one end supported by the end of said spoke, a pin having sliding movement in the opening in said spoke having means to limit the relative movement of said parts, extending through said spring and having a part to engage that end of said spring opposite the end supported by said spoke, whereby the movement of said spoke in either direction relatively to said casing will cause said spring to be compressed.

4. In a wheel, the combination, with a hub, a rim, and a spoke comprising diverging members pivotally connected to said hub on opposite sides of the transverse center thereof, said spoke having a guideway in the outer end thereof, of a connecting device interposed between said spoke and said rim and comprising a cylindrical casing having an opening in the inner end thereof to loosely receive the outer end of said spoke, whereby said spoke may have pivotal movement relatively to said casing, a pin extending through the guideway in said spoke and having a part to engage the end portion of said spoke to limit the movement of the spoke relatively to the pin and having at its opposite end a head, and a spring coiled about said pin between said head and the end of said spoke.

5. In a wheel, the combination, with a hub, a rim, and a spoke comprising diverging members pivotally connected to said hub on opposite sides of the transverse center thereof, said spoke having a guideway in the outer end thereof, of a connecting device interposed between said spoke and said rim and comprising a cylindrical casing having an opening in the inner end thereof to loosely receive the outer end of said spoke, whereby said spoke may have pivotal movement relatively to said casing, a pin extending through the guideway in said spoke and having a part to engage the end portion of said spoke to limit the movement of the spoke relatively to the pin and having at its opposite end a head, a spring coiled about said pin between said head and the end of said spoke, a ring rigidly secured to said rim and arranged between the same and said hub, arms rigidly secured to said hub, and link connections between said arms and said rim.

In testimony whereof, I affix my signature in presence of two witnesses.

BERT WALTERS.

Witnesses:
  JOHN B. McGAM,
  LAWRENCE E. LAYBOURNE.

Copies of this patent may be obtained for five cents each, by addressing the "Commissioner of Patents, Washington, D. C."